US008219369B2

(12) United States Patent
Thompson, Jr. et al.

(10) Patent No.: US 8,219,369 B2
(45) Date of Patent: Jul. 10, 2012

(54) AUTOMATIC GENERATION OF JOINT LOCATIONS

(75) Inventors: Thomas R. Thompson, Jr., Madison Heights, MI (US); Anthony J. Salerno, Fenton, MI (US)

(73) Assignee: Siemens Product Lifecycle Management Sofrware Inc., Plano, TX (US)

( * ) Notice: Subject to any disclaimer, the term of this patent is extended or adjusted under 35 U.S.C. 154(b) by 439 days.

(21) Appl. No.: 12/491,834

(22) Filed: Jun. 25, 2009

(65) Prior Publication Data

US 2009/0326877 A1 Dec. 31, 2009

Related U.S. Application Data

(60) Provisional application No. 61/075,919, filed on Jun. 26, 2008.

(51) Int. Cl.
*G06F 17/50* (2006.01)
*G06G 7/48* (2006.01)

(52) U.S. Cl. .................... 703/7; 703/1; 703/8

(58) Field of Classification Search .............. 703/1, 8, 703/7
See application file for complete search history.

(56) References Cited

U.S. PATENT DOCUMENTS

| 6,233,538 B1 * | 5/2001 | Gupta et al. ............... 703/6 |
| 6,822,195 B2 * | 11/2004 | Kanodia et al. .......... 219/124.22 |
| 2004/0019402 A1 * | 1/2004 | Bourne et al. .............. 700/165 |

OTHER PUBLICATIONS

Mezentsev, Andrey A. et al., "Methods and Algorithms of Automated CAD Repair for Incremental Surface Meshing", Nov. 13, 2007.*
Zha X.F. et al., "Knowledge-Based Approach and System for Assembly Oriented Design, Part I: The Approach", Aug. 1, 2000, Engineering Applications of Artificial Intelligence 14, Elsevier Science Ltd.*
"Determining the centerline of a simple elongated shape", retrieved online Jun. 23, 2009, http://www.caip.rutgers.edu/~feher/node9.html, 1 page.
Ruge, et al.; Handbuch der Schweisstechnik; vol. 3, 1985, pp. 117-125, Berlin, DE; p. 117-121; figures 30.118-30.119; Others; 1985; DE.
Chickermane, et al.; Engineering with Computers, Springer, UK, GB, vol. 13, No. 4; pp. 235-243; ISSN: 0177-0667; abstract, p. 240, col. 2, paragraph 2—p. 241, col. 2, paragraph 2; figures 3-6, 9, 10; Magazine; 1997; GB.
Liao, et al; The Int'l Journal of Advanced Manufacturing Technology, Springer, Berlin, DE, vol. 36, No. 3-4; pp. 386-394, ISSN : 1433-3015; Magazine; 2007; DE.
Chang, et al.; Advances in Engineering Software, Elsevier Science, Oxford, GB; vol. 37, No. 12; pp. 779-2796; ISSN: 0965-9978; p. 787, col. 2, paragraph 3; Others; 2006; GB.

* cited by examiner

*Primary Examiner* — Kandasamy Thangavelu
*Assistant Examiner* — Cedric D Johnson

(57) ABSTRACT

A method determines overlap regions by identifying a face on a first component part of an assembly that is less than a specified gap distance from a face on a second component part of the assembly. The method is also for determining if a minimum width of each of one or more the overlap regions exceeds a specified maximum value, and if the minimum width of an overlap region does not exceed the specified maximum value, determining a guide curve along a centerline of the overlap region. If the minimum width of an overlap region exceeds the specified maximum value, the method is further for determining two or more guide curves along an offset of two or more edges of the overlap region. The method also is for determining one or more joint locations along the guide curve or curves based upon one or more parameters.

20 Claims, 10 Drawing Sheets

AUTOMATIC GENERATION OF JOINT LOCATIONS

CROSS-REFERENCE TO OTHER APPLICATION

This application claims priority from U.S. Provisional Patent Application No. 61/075,919, filed Jun. 26, 2008, which is hereby incorporated by reference.

TECHNICAL FIELD

The present disclosure is directed, in general, to computer-aided design (CAD) and, more specifically, to the automatic generation of joint locations using CAD data.

BACKGROUND OF THE DISCLOSURE

Sheet or solid metal parts can be joined together by various means at locations referred to herein as "joint locations". The joint locations may be in various forms such as spot welds, mechanical clinches, nuts and bolts, or rivets.

SUMMARY OF THE DISCLOSURE

Various embodiments include a system, method, and computer program product for determining overlap regions by identifying a face on a first component part of an assembly that is less than a specified gap distance from a face on a second component part of the assembly. Various embodiments also include determining if a minimum width of each of one or more overlap regions exceeds a specified maximum value, and if the minimum width of an overlap region does not exceed the specified maximum value, determining a guide curve along a centerline of the overlap region. If the minimum width of an overlap region exceeds the specified maximum value, the embodiment is further for determining two or more guide curves along an offset of two or more edges of the overlap region. Various embodiments also include determining one or more joint locations along the guide curve or curves based upon one or more parameters, and displaying the one or more joint locations using symbols or solid objects to represent the one or more joint locations.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present disclosure will be described with reference to exemplary non-limiting embodiments.

Following are short definitions of the usual meanings of some of the technical terms which are used in the present disclosure. (However, those of ordinary skill will recognize whether the context requires a different meaning.) Additional definitions can be found in the standard technical dictionaries and journals.

The term "CAD system" or "CAD systems" refers collectively to computer-aided design, manufacturing, and visualization systems.

The term "overlap region" or "overlap regions" refers to areas where two or more parts can be joined together in a CAD system or in the eventual manufacture. In some embodiments herein, this can include a set of sheet or solid bodies where a target set of faces is modified by projecting the boundary curves of the other faces to the target set of faces.

Figure 1:
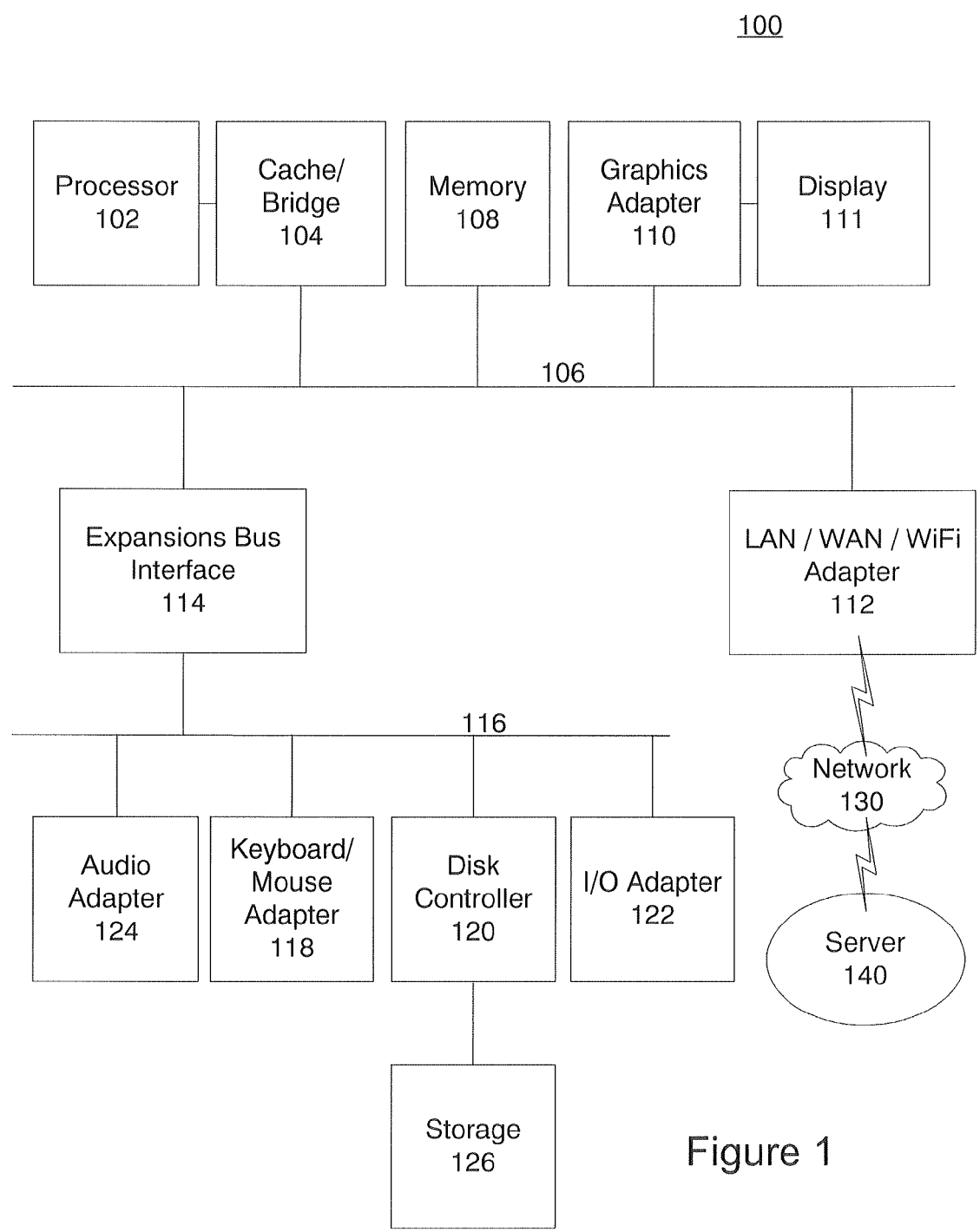
FIG. 1 depicts a block diagram of a data processing system in which an embodiment can be implemented.

FIG. 1 depicts a block diagram of a data processing system 100 in which an embodiment of the present disclosure can be implemented. The data processing system 100 depicted includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g., WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. Disk controller 120 can be connected to a storage 126, which can be any suitable machine usable or machine readable storage medium including, but not limited to, nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 116 in the example shown is an audio adapter 124, to which speakers (not shown) may be connected for playing sounds. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

The LAN/WAN/Wireless adapter 112 can be connected to a network 130 (not a part of the data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100.

In order to determine the most advantageous locations to join a given assembly of component sheet or solid metal parts, the relevant overlap areas in the assembly are identified. Once the relevant overlap areas are identified, the best joint locations for the relevant overlap regions are then determined. The joint locations determined may be in various forms such as spot welds, mechanical clinches, nuts and bolts, or rivets.

Spot weld or other connecting joint locations are specified early in a design cycle in order to communicate the information to all disciplines that are required to act upon it. These disciplines include, but are not limited to, analysis groups that may need to perform structural analysis studies on the joined assembly, tooling groups that need to build assembly tooling that will hold the individual parts being assembled, manufacturing groups that need to identify other weld information such as weld gun, clamp and hold time, and groups that may need to create robot paths for weld automation. Currently these joint locations are identified individually using industry and customer design standards along with designer knowledge. Typically the joints are placed and then augmented with additional information describing the joint. This may be very time consuming considering a typical automotive vehicles body in white may require 3000-5000 joints to hold it together.

The present disclosure discloses a system and method for evaluating an input set of electronic data components representing a given assembly of component sheet metal or solid parts to determine overlap regions and the placement of spot welds or other connecting joints within the overlap regions according to user-specific parameters.

Figure 2:
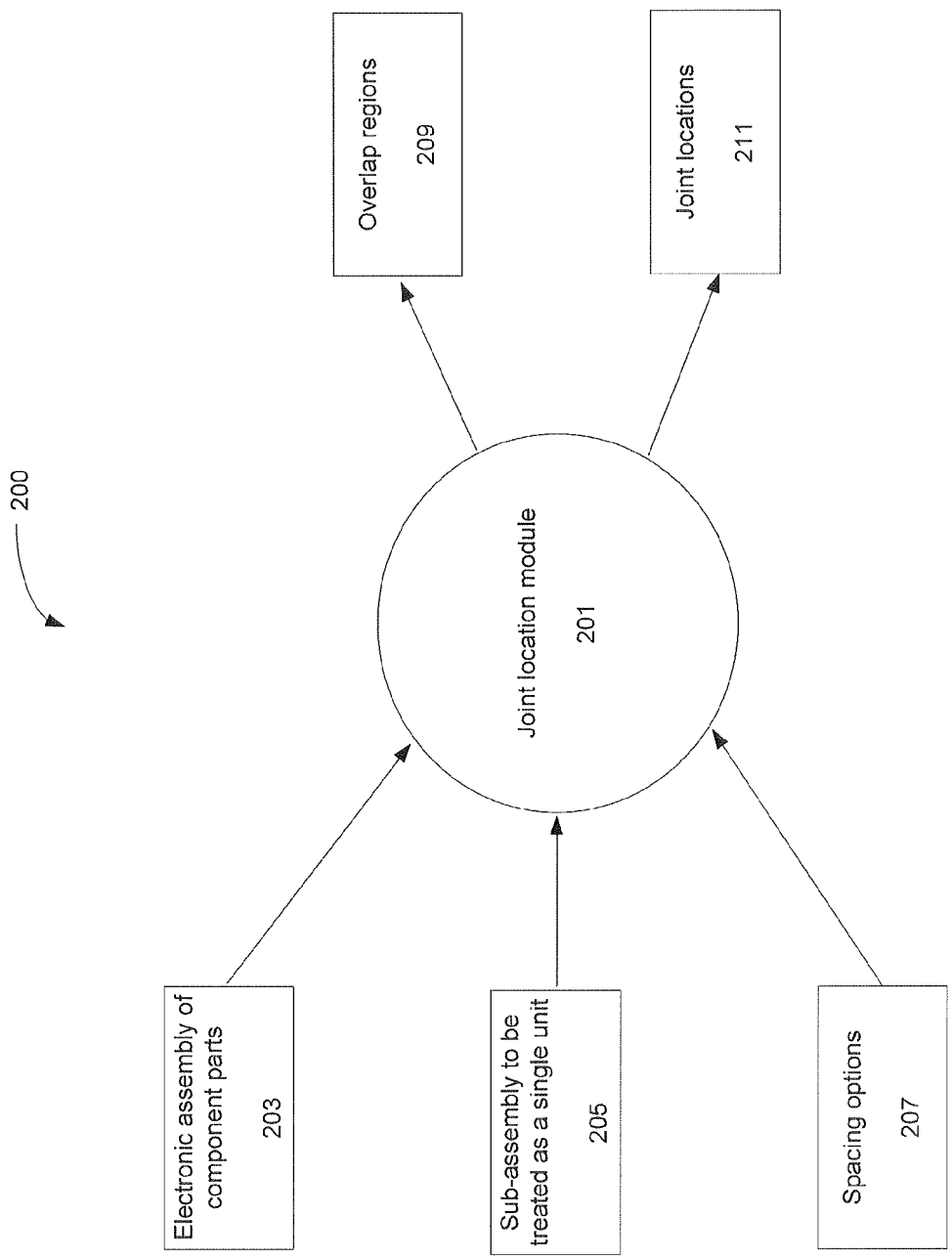
FIG. 2 depicts a block diagram of a joint location system according an embodiment of the present disclosure.

FIG. 2 depicts a block diagram of a joint location system 200 according an embodiment of the present disclosure that can be implemented, for example, by the data processing system 100.

The joint location system 200 comprises a joint location module 201 which receives various inputs from a user. In the embodiment shown in FIG. 2, the inputs from the user include an indication of two or more components of sheet or solid metal parts 203 comprising a given assembly. The joint location system 200 then retrieves the electronic or CAD data components corresponding to the two or more components of sheet or solid metal parts 203. The inputs also include any sub-assembly 205 within the two or more components of sheet or solid metal parts 203 that is to be treated as a single unit. Sub-assemblies refer to various components that have been previously joined together. The inputs further include one or more spacing options 207 that include, but are not limited to, a minimum number of joint locations for an overlap area, a minimum spacing distance between joint locations, a maximum spacing distance between joint locations, an offset of the joint locations from an edge, a maximum width for a centerline, a maximum bend radius, and a minimum flange width.

The joint location module 201 then uses the various inputs from the user to determine one or more overlap regions as well as the joint locations for each of the overlap regions. The joint location module 201 then produces overlap regions 209 and joint locations 211 as outputs of the joint location module 201. The overlap regions 209 and the joint locations 211 may be stored in the storage 126 and/or displayed on the display 111.

The joint location module 201 may reside, for example, in the storage 126 of the data processing system 100. The various inputs, such as the spacing options 207, may be received by the joint location module 201, for example, via a device connected to the keyboard/mouse adapter 118 or the I/O adapter 122. The inputs also may be inputted by way of the display 111 if the display 111 is provided with a touch-sensitive screen. The outputs of the joint location module 201, such as the overlap regions 209 and the joint locations 211, may be transmitted, for example, by way of a device connected to the I/O adapter 122 or the display 111.

Figure 3:
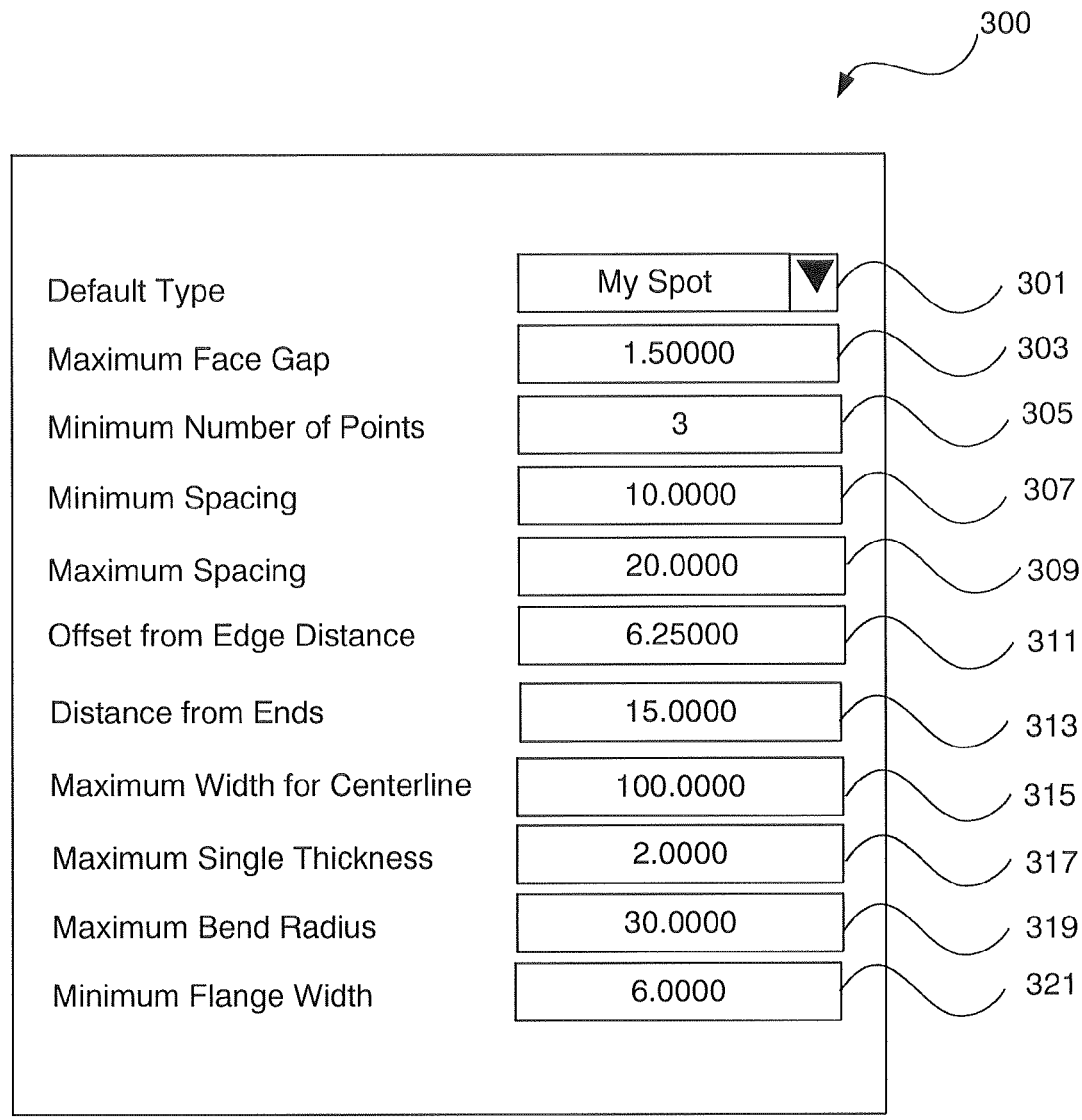
FIG. 3 shows an example of an input screen for entering spacing options according to an embodiment of the present disclosure.

FIG. 3 shows an example of an input screen 300 for entering spacing options 207 according to an embodiment of the present disclosure.

As shown in FIG. 3, an area 301 is provided for selecting the type of joint location to be created. An area 303 is provided for entering the maximum face gap. This value controls the faces found for generating the overlap region. Faces within this value will be used for the generating the overlap sheet. An area 305 is provided for entering the minimum number of joint locations per overlap sheet to be created. An area 307 is provided for entering the minimum allowable spacing between joint locations. Joint locations will not be created closer than this value. An area 309 is provided for entering the maximum allowable spacing between joint locations.

In some embodiments, this spacing distance will be used if the minimum number of joint locations entered into area 305 can be maintained. In other embodiments, the minimum number of joint locations entered into area 305 will not be created if it violates the minimum spacing distance entered into area 307.

An area 311 is provided for entering the offset distance from an edge when centerline spacing is not used. An area 313 is provided for entering the distance from the guide curve ends to space joint locations. An area 315 also is provided for entering the maximum width for the centerline. For each overlap region, a minimum width will be computed. If the minimum width of an overlap region is less than the maximum width value entered into area 315, a guide curve using a centerline will be used for the overlap region. If the minimum width of an overlap region is not less than the maximum width value entered into area 315, two rows of joint locations will be created along offset edges of the overlap region. If two rows of joint locations are created along offset edges of the overlap region, the distance of the joint locations from the edges will be determined by the value entered into an area 311.

An area 317 is provided for entering the maximum material thickness of all assembly components. An area 319 is provided for entering the maximum bend radius on a face that will not have a joint location. An area 321 is provided for entering the minimum width of an overlap region that can have a joint location.

Figure 4:
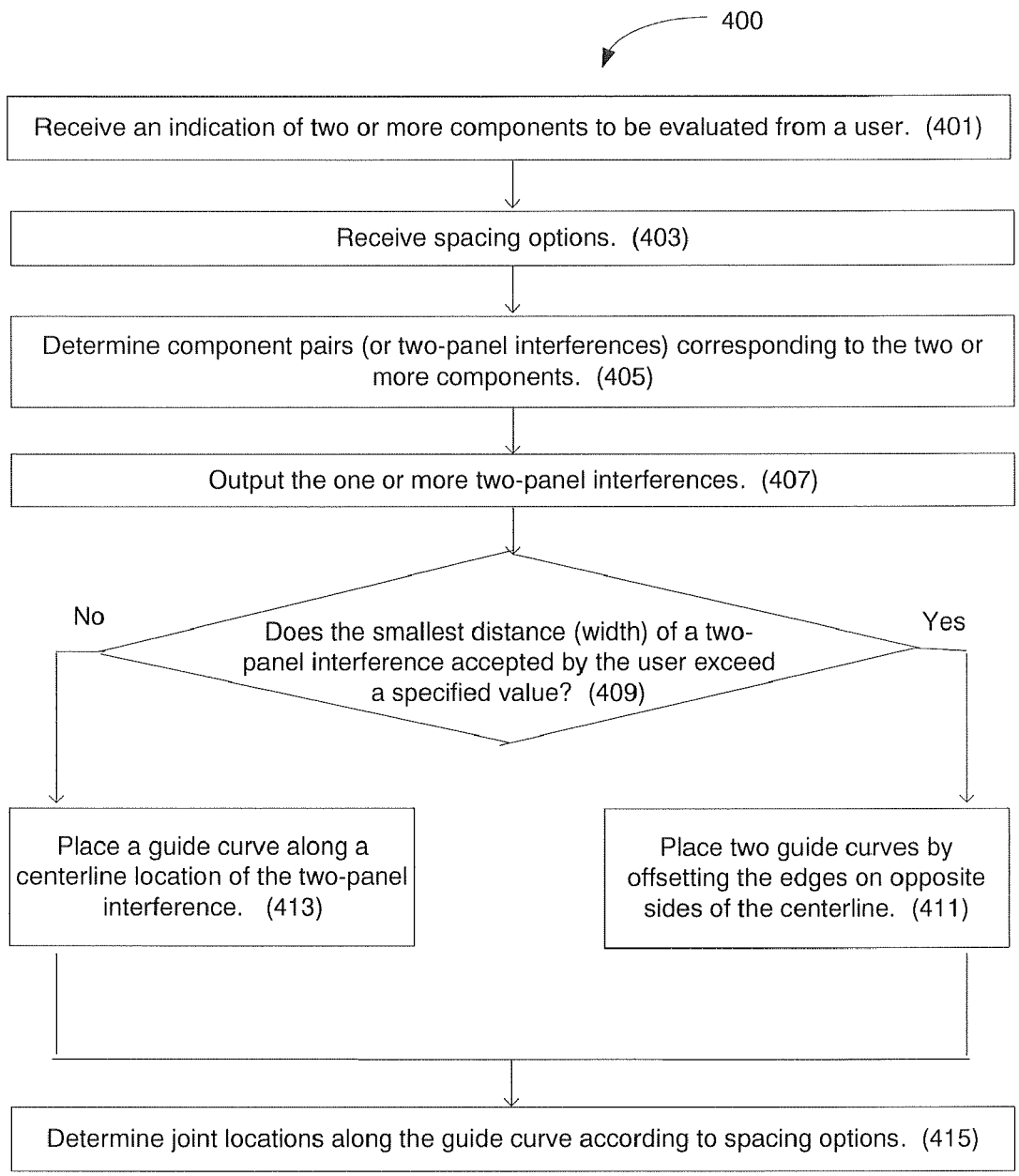
FIG. 4 illustrates a method for determining joint locations in a given assembly of component sheet or solid metal parts using CAD data components according an embodiment of the present disclosure.

FIG. 4 illustrates a method 400 for determining joint locations in a given assembly of component sheet metal parts using CAD data components according an embodiment of the present disclosure.

As shown in FIG. 4, the joint location module 201 receives an indication of two or more components to be evaluated from a user (block 401). In some embodiments, the user inputs the components to be evaluated by selecting 'all' or identifying individual components. The joint module 201 also receives spacing options from the user (block 403). The joint location module 201 then retrieves the electronic or CAD data components corresponding to the two or more components of sheet metal or solid parts and determines one or more component pairs (i.e., two-panel interferences) corresponding to the two or more components (block 405).

In some embodiments, the joint location module 201 determines the two-panel interferences by finding pairs of assembly components that are within a tolerance. Each pair of assembly components that is within a tolerance creates an interference. The joint location module 201 then determines the faces that will touch each other after the two or more components are joined together. In some embodiments, this is accomplished by determining a set of near planar faces (based on radius of curvature) for each interference. The joint location module 201 then determines the faces of each assembly component that have a face in another component with opposite face normals (when using solids) or parallel face normals (when using sheets) and are less than a user specified gap distance. This indicates two sets of faces where two components will be joined. Of course, some faces may extend beyond others. The two-panel interference is now determined for the two sets of near planar faces. In some embodiments, the two-panel interference is determined by projecting edge boundary curves from one set of near planar faces to another set of near planar faces, which results in a set of trimmed sheets. The resulting two-panel interference may be disjointed (not connected).

Once one or more two-panel interferences are determined, the joint location module 201 outputs the one or more two-panel interferences (block 407) by storing and/or displaying the one or more two-panel interferences. In some embodiments, since some invalid two-panel interferences may be found, the user will be able to preview the two-panel interferences and delete two-panel interferences on which joint locations should not be created. For example, a two-panel interference where a weld nut and weld stud are being joined would not need a joint location. The joint location module 201 then determines if the smallest distance (width) of two-panel interference accepted by the user exceeds a specified value (block 409). If the smallest distance (width) of the two-panel interference exceeds the specified value, the joint location module 201 places two or more guide curves by offsetting the two or more edges on opposite sides of a centerline location of the two-panel interference (block 411). In some embodiments, the guide curves will be approximately in the same direction as the centerline. If the smallest distance (width) of the two-panel interference does not exceed the specified value, the joint location module 201 places a guide curve along a centerline location of the two-panel interference (block 413). Joint locations along the guide curve or curves are then determined according to spacing options 207 (block 415).

Figure 5:
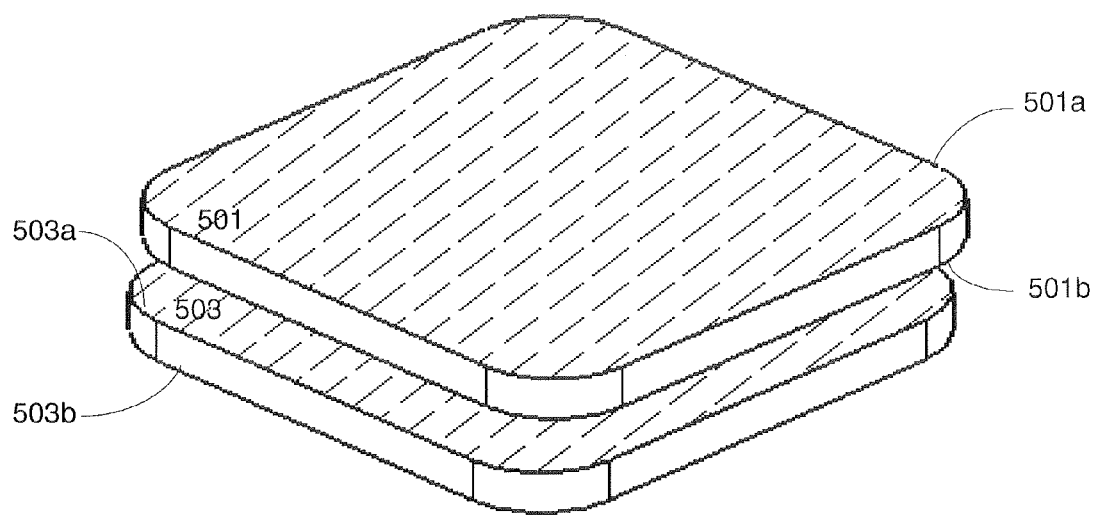
FIG. 5 illustrates possible overlap regions for two solids to be joined together according to an embodiment of the present disclosure.

FIG. 5 illustrates possible untrimmed overlap regions for two solids to be joined together according to an embodiment of the present disclosure.

FIG. 5 shows a first solid 501 to be joined with a second solid 503. Because the parts to be joined are defined as solids, the joint location module 201 determines the faces that are within a maximum face gap (for example, the value entered by the user in area 303). In this embodiment, there are four possible untrimmed overlap regions. A first untrimmed overlap region 501*a* is possible on the top side of the first solid 501. A second untrimmed overlap region 501*b* is possible on the bottom side of the first solid 501. A third untrimmed overlap region 503*a* is possible on the top side of the second solid 503. A fourth untrimmed overlap region 503*b* is possible on the bottom side of the second solid 503.

Figure 6:
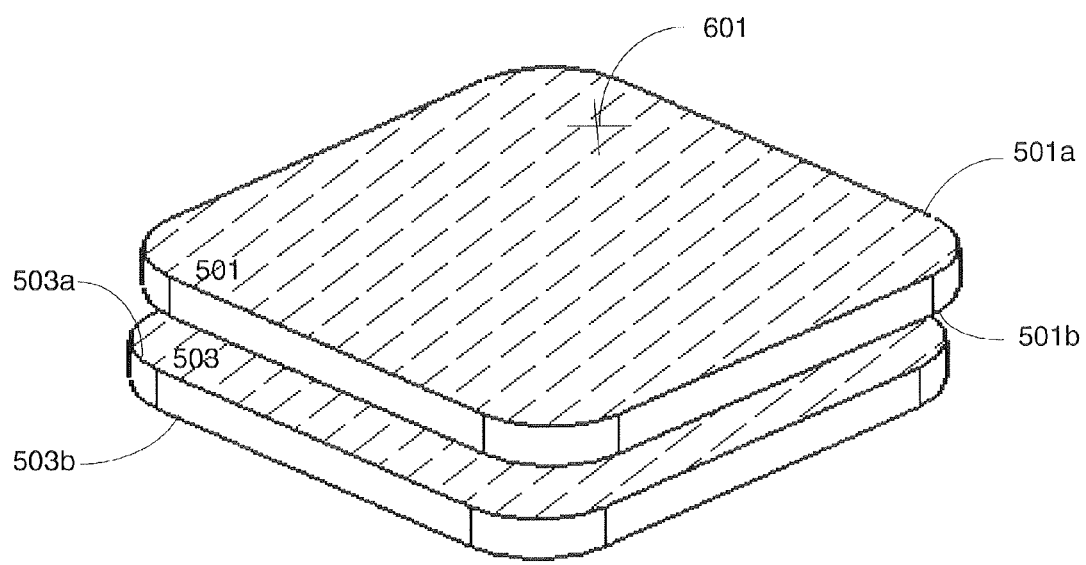
FIG. 6 illustrates a placement of a joint location according to an embodiment of the present disclosure.

FIG. 6 illustrates a placement of a joint location according to an embodiment of the present disclosure.

To make viewing of a joint location as simple as possible, the joint location will be placed on one of the "outside faces". In this embodiment, the face that is closest to the outside of the assembly will be used. If there is another part near the second solid 503, a joint location 601 is placed on the top side of first solid 501. In some embodiment, the joint location will not be between the touching faces.

The systems and methods of the present invention can provide feedback to the designer regarding the number of sheet or solid panels being overlapped in a given area. This enables the designer to do feasibility studies evaluating the manufacturability of a joint location. For example, the systems and methods of the present invention may identify a condition where there is an overlap of 4 or more panels in an overlap area. It is important to identify such an overlap early in the design process because four or more panels are very difficult and costly to weld. Identifying such an overlap early in the design process allows the designer to determine if a change can be made to the overlap region by adding a cut-out to one panel thus changing the overlap region from 4 to 3 panels and making it easier and less expensive to manufacture.

Figure 7A:
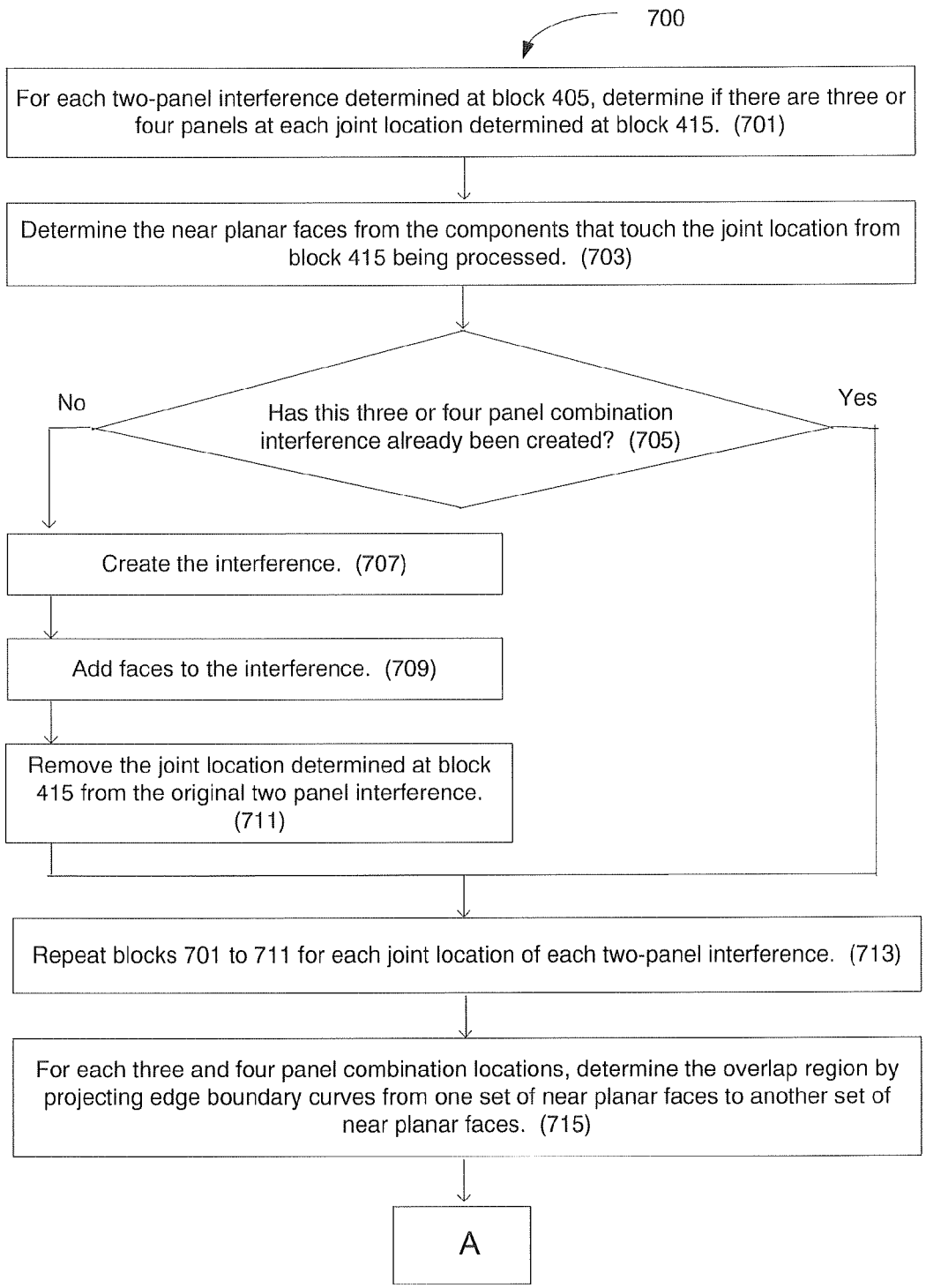
FIGS. 7A and 7B illustrate a method for determining if an overlap region comprises three or more sheet or solid panels to be joined together.
Figure 7B:
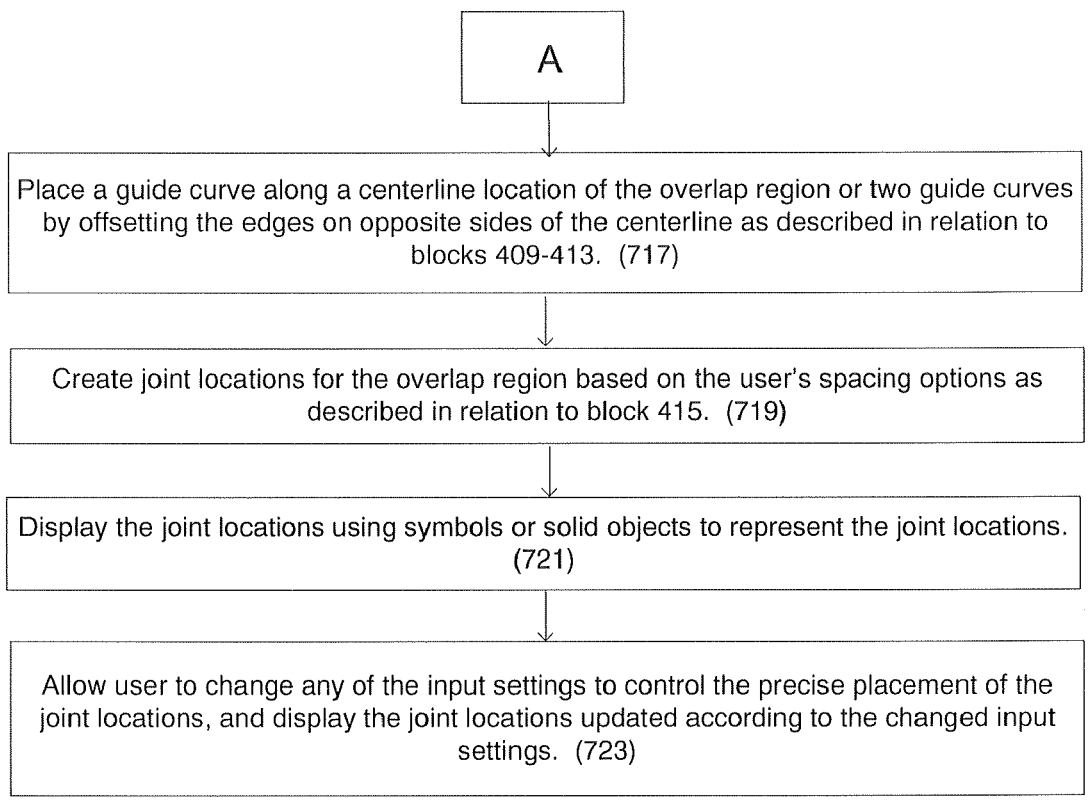

FIGS. 7A and 7B illustrate a method 700 for determining if an overlap region comprises three or more sheet or solid panels to be joined together.

For each of the two panel interferences determined at block 405 of FIG. 4, the joint location module 201 determines if there are three or more panels at each joint location determined at block 415 (block 701). This is a minimum distance check. The joint location module 201 then determines the near planar faces from the components that touch the joint location being processed (block 703) and determines if this three or more panel combination interference has already been created (block 705). In this determination, interference combinations of A-B-C and C-B-A are treated as the same interference combination. If the interference combination has not been created, the joint location module 201 creates the interference (block 707) and adds faces to this interference (block 709). The joint locations created at block 415 are then removed (block 711). Blocks 701 to 711 are then repeated for the joint locations of each two-panel interference (block 713).

The joint location module 201 has now determined all the two panel combinations and the new interference items that represent the three or more panel combination locations. For each three or more panel combination locations, the overlap region is determined by projecting edge boundary curves from one set of near planar faces to another set of near planar faces (block 715). This creates 3 or more sets of near planar faces instead of two sets of planar faces. A guide curve is created along a centerline of the overlap region, or two or more guide curves are created by offsetting the edges on opposite sides of a centerline of the overlap region as described in relation to blocks 409-413 (block 717), and joint locations are created based on the user's spacing options as described in relation to block 415 (block 719).

The joint location module 201 then displays the joint locations using symbols or solid objects to represent the joint locations (block 721). The user is then allowed to change any of the input settings to control the precise placement of the joint locations. The joint location module 201 then displays the joint locations updated according to the changed input settings (block 723).

Figure 8:
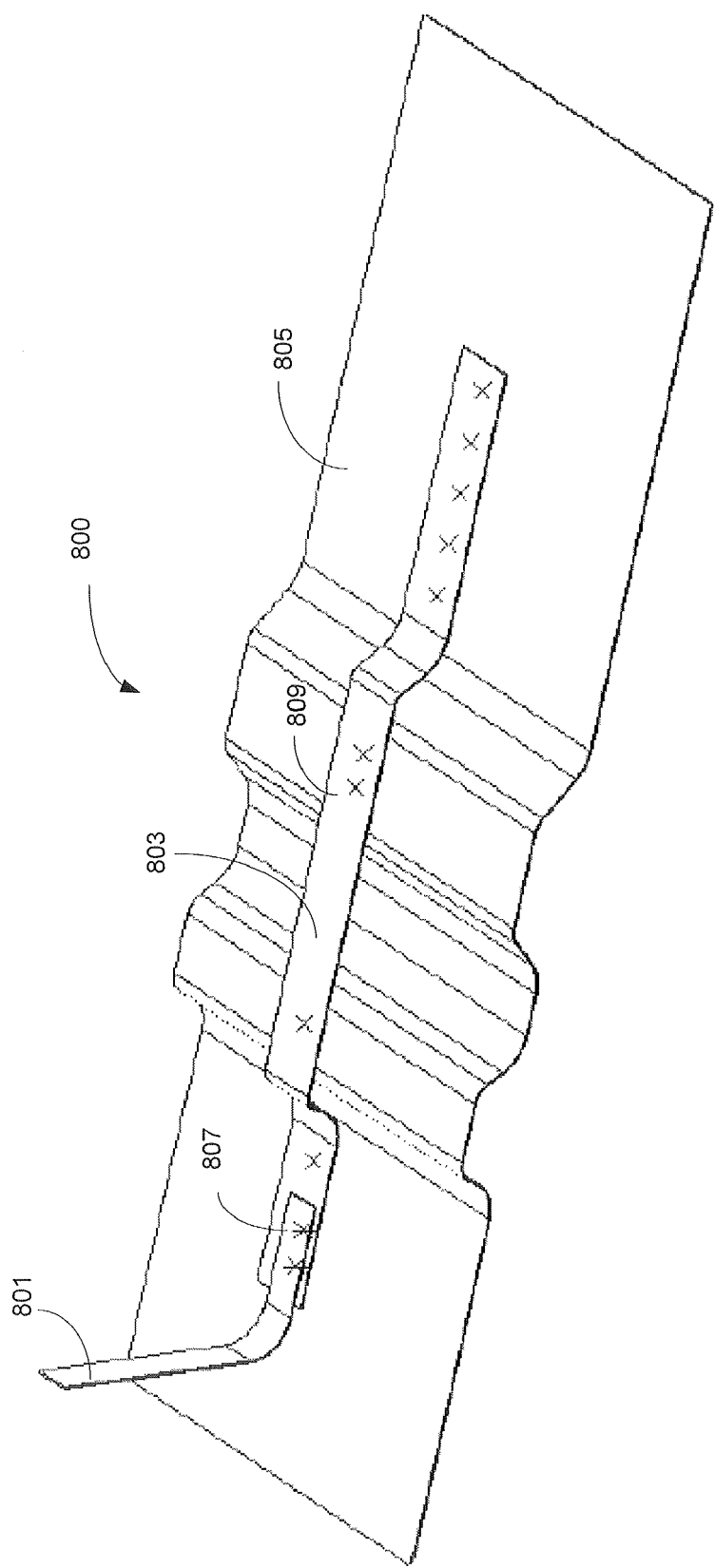
FIG. 8 illustrates an assembly having three component parts joined according to an embodiment of the present disclosure.

FIG. 8 illustrates an assembly 800 having three component parts joined according to an embodiment of the present disclosure.

As shown in FIG. 8, the assembly 800 comprises a first component part 801, a second component part 803, and a third component part 805. The first component part 801 is shown as joined to the second component part 803 and the third component part 805 by two joint locations one of which is designated by a marker 807. Furthermore, the second component part 803 is joined to the third component part 805 by numerous joint locations one of which is designated by a marker 809. In this particular embodiment, the number of components being joined at a particular joint location is indicated by the number of lines forming the marker. With regard to the marker 807, this marker is formed by three lines indicating that three component parts are being joined at that joint location. In the same manner, the marker 809 is formed by two lines indicating that two component parts are being joined at that joint location.

Figure 9:
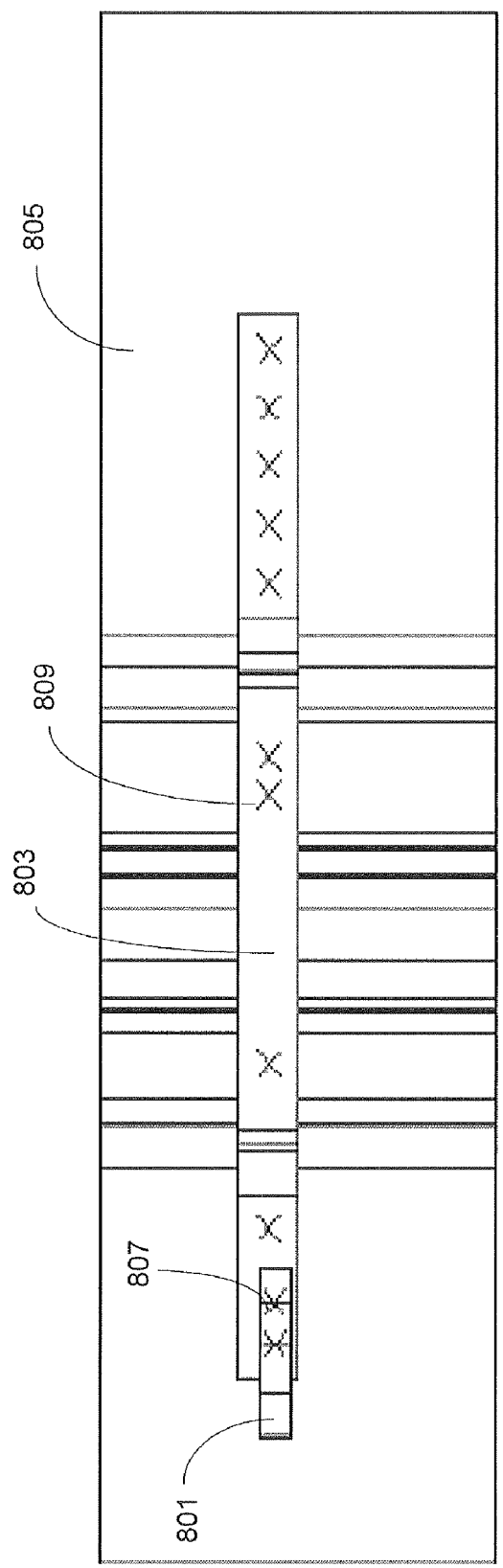
FIG. 9 illustrates a top view of the assembly of FIG. 8 according to an embodiment of this disclosure.

FIG. 9 illustrates a top view of the centerline of the assembly of FIG. 8 according to an embodiment of this disclosure. In this particular embodiment, the marker 807 is not on the same centerline as the marker 809.

Accordingly, the system and method of the present disclosure determines the overlap regions that exist based on values supplied by the user. In some embodiments, the overlap regions are organized by the number of components participating in the overlap region and presented to the user for interrogation. The user can accept or exclude any of the overlap regions found. The joint locations are generated, saved, and made available for downstream usage. The method and system of the present disclosure consistently applies design rules resulting in uniform joint location placement. Thus, the creation of joint locations is accomplished in a predictable and consistent manner. This allows sheet and solid metal assemblies to be manufactured in an improved and more cost-effective way. Because joint locations are only placed in overlap regions, the problem of placing a joint location in a non-valid position is eliminated. Furthermore, having the ability to quickly generate joint locations enables analysis to be done on electronic models early in the design cycle to validate joint placement. This will enable structural and manufacturing analysis to be run earlier in the design cycle where making changes is less costly to the overall development.

Other methods of determining joint locations work on finite element meshes only using edge data. These methods work by creating large set of points and then deleting ones that fall within a predetermined minimum spacing. In distinct contrast, the method and system of the present application differs from the edge data approach in that the method and system of the present application works on electronic CAD data, be it face or solid representations. The face-based approach of method and system of the present application enables a more refined method of locating joint connections as opposed to the edge data approach.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present disclosure should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method of identifying joint locations for an assembly using individual electronic component part files in a computer-aided design system, the method comprising:
    determining, by the computer-aided design system, one or more overlap regions by identifying a first normal of a first face on a first component part of the assembly that is one of opposite to and parallel to a second normal of a second face on a second component part of the assembly and identifying that the first face is less than a specified gap distance from the second face using a first component part electronic file corresponding the first component part and a second component part electronic file corresponding the second component part;
    determining, by the computer-aided design system, a number of guide curves along each of the one or more the overlap regions based on whether a minimum width of each of the one or more the overlap regions exceeds a specified maximum value; and
    determining, by the computer-aided design system, one or more joint locations along the number of guide curves based upon one or more parameters.

2. A method in accordance with claim 1, wherein determining the number of guide curves comprises:
    determining, by the computer-aided design system, if the minimum width of each of the one or more the overlap regions exceeds the specified maximum value; and
    if the minimum width of an overlap region does not exceed the specified maximum value, determining, by the computer-aided design system, a guide curve along a centerline of the overlap region, and if the minimum width of an overlap region exceeds the specified maximum value, determining, by the computer-aided design system, two or more guide curves along an offset of two or more edges of the overlap region.

3. A method in accordance with claim 2 wherein the one or more parameters include a minimum number of joint locations for the overlap area, a minimum spacing distance between joint locations, a maximum spacing distance between joint locations, an offset of the joint locations from an edge of the overlap region; a maximum bend radius, and a minimum flange width.

4. A method in accordance with claim 2 further comprising:
    allowing, by the computer-aided design system, a user to reject an overlap region from the one or more overlap regions.

5. A method in accordance with claim 2 further comprising:
    modifying, by the computer-aided design system, one or more joint locations along the number of guide curves based upon one or more parameters modified by a user; and
    displaying, by the computer-aided design system, the modified one or more joint locations using symbols or solid objects to represent the one or more joint locations.

6. A method in accordance with claim 1 wherein identifying the first normal of the first face on the first component part of the assembly that is one of opposite to and parallel to the second normal of the second face on the second component part of the assembly and identifying that the first face is less than a specified gap distance from the second face comprises:
    projecting edge boundary curves from a first set of near planar faces to a second set of near planar faces.

7. A method in accordance with claim 1 wherein the first component part is a sub-assembly of component parts containing pre-existing joint locations and is treated as a single component by the computer-aided design system.

8. A joint location system using individual electronic component part files in a computer-aided design system, the system comprising:
    an input device configured to receive an indication of a first component part and a second component part;
    a joint location module configured to:
        retrieve a first component part electronic file corresponding to the first component part and a second component part electronic file corresponding to the second component part, and
        determine one or more overlap regions by identifying a first normal of a first face on the first component part that is one of opposite to and parallel to a second normal of a second face on the second component part and identifying that the first face is less than a specified gap distance from the second face using the first component part electronic file and the second component part electronic file;
        determining a number of guide curves along each of the one or more the overlap regions based on whether a minimum width of each of the one or more the overlap regions exceeds a specified maximum value; and
        determining one or more joint locations along the number of guide curves based upon one or more parameters; and
    a display device configured to display the one or more overlap regions.

9. A system in accordance with claim 8 wherein to determine the number of guide curves the joint location module is further configured to:
    determine if the minimum width of each of the one or more the overlap regions exceeds the specified maximum value, and
    if the minimum width of an overlap region does not exceed the specified maximum value, determine a guide curve along a centerline of the overlap region, and if the minimum width of an overlap region exceeds the specified maximum value, determine two or more guide curves along an offset of two or more edges of the overlap region.

10. A system in accordance with claim 9 wherein the display device is further configured to display the one or more joint locations using symbols or solid objects to represent the one or more joint locations.

11. A system in accordance with claim 8 wherein the one or more parameters include a minimum number of joint locations for the overlap area, a minimum spacing distance between joint locations, a maximum spacing distance between joint locations, an offset of the joint locations from an edge of the overlap region, a maximum bend radius, and a minimum flange width.

12. A system in accordance with claim 8 wherein the joint location module is further configured to allow a user to reject an overlap region from the one or more overlap regions.

13. A system in accordance with claim 8 wherein the joint location module is further configured to modify one or more joint locations along the number of guide curves based upon one or more parameters modified by a user; and the display device is further configured to display the modified one or more joint locations using symbols or solid objects to represent the one or more joint locations.

14. A system in accordance with claim 8 wherein the joint location module is configured to identify the first normal of the first face on the first component part that is one of opposite to and parallel to the second normal of the second face on the second component part and identify that the first face is less than a specified gap distance from the second face by projecting edge boundary curves from a first set of near planar faces to a second set of near planar faces.

15. A system in accordance with claim 8 wherein the first component part is a sub-assembly of component parts containing pre-existing joint locations and is treated as a single component by joint location module.

16. A data processing system comprising a processor and accessible memory, the data processing system configured to implement a joint location module using individual electronic component part files in a computer-aided design system, the module for:

retrieving a first component part electronic file corresponding to a first component part and a second component part electronic file corresponding to a second component part;

determining one or more overlap regions by identifying a first normal of a first face on the first component part that is one of opposite to and parallel to a second normal of a second face on the second component part and identifying that the first face is less than a specified gap distance from the second face using the first component part electronic file and the second component part electronic file;

determining a number of guide curves along each of the one or more the overlap regions based on whether a minimum width of each of the one or more the overlap regions exceeds a specified maximum value; and determining one or more joint locations along the number of guide curves based upon one or more parameters.

17. The data processing system in accordance with claim 16 wherein in determining the number of guide curves the joint location module is further for:

determining if the minimum width of each of the one or more the overlap regions exceeds the specified maximum value; and if the minimum width of an overlap region does not exceed the specified maximum value, determining a guide curve along a centerline of the overlap region, and if the minimum width of an overlap region exceeds the specified maximum value, determining two or more guide curves along an offset of two or more edges of the overlap region.

18. The data processing system in accordance with claim 16 wherein the one or more parameters include a minimum number of joint locations for the overlap area, a minimum spacing distance between joint locations, a maximum spacing distance between joint locations, an offset of the joint locations from an edge of the overlap region a maximum bend radius, and a minimum flange width.

19. The data processing system in accordance with claim 16 wherein the joint location module is further for modifying one or more joint locations along the number of guide curves based upon one or more parameters modified by a user.

20. The data processing system in accordance with claim 16 wherein the joint location module identifies the first normal of the first face on the first component part that is one of opposite to and parallel to the second normal of the second face on the second component part and identifies that the first face is less than a specified gap distance from the second face by projecting edge boundary curves from a first set of near planar faces to a second set of near planar faces.

\* \* \* \* \*